(Model.)
J. C. TENNENT.
TRANSPLANTER.
No. 252,403. Patented Jan. 17, 1882.
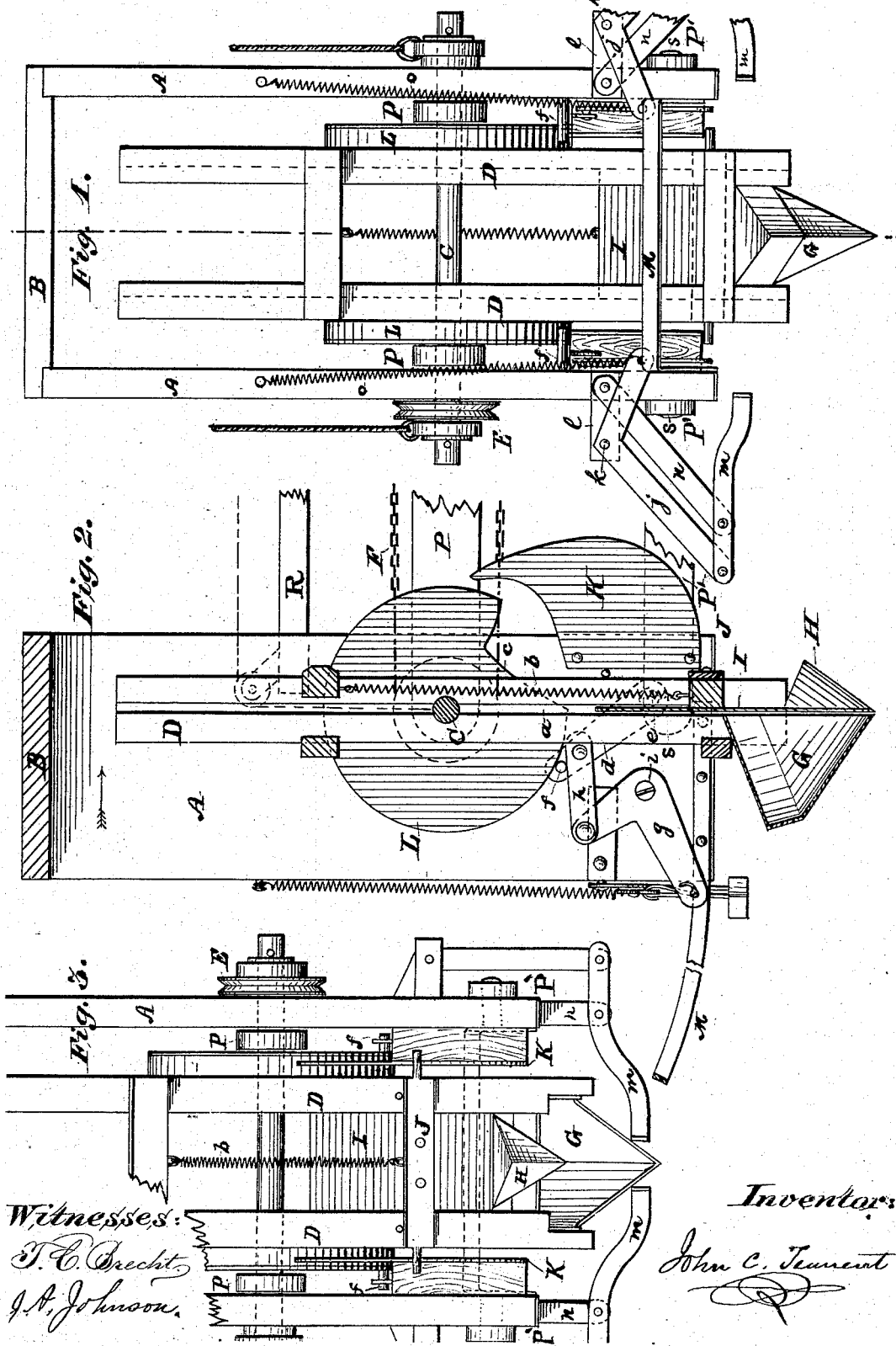
Witnesses:
T. C. Brecht
J. A. Johnson
Inventor:
John C. Tennent

UNITED STATES PATENT OFFICE.

JOHN C. TENNENT, OF GLYNDON, MARYLAND.

TRANSPLANTER.

SPECIFICATION forming part of Letters Patent No. 252,403, dated January 17, 1882.

Application filed September 14, 1881. (Model.)

*To all whom it may concern:*

Be it known that I, JOHN C. TENNENT, a citizen of the United States of America, residing at Glyndon, in the county of Baltimore and State of Maryland, have invented certain new and useful Improvements in Tobacco and Cabbage Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a rear view. Fig. 2 is a vertical central sectional view. Fig. 3 is a front view.

My invention is designed as an improvement on my former patent bearing date of July 31, 1877, and numbered 193,734.

My invention consists, broadly, of a rectangular frame in which are mounted the planting-arms, said frame being adapted to be attached to the rear end of a cart, wagon, or other vehicle, from which vehicle power is derived for operating the planting-arms.

It consists, further, of certain details of construction hereinafter more fully described, and pointed out in the claims.

Referring to the drawings, A A are the side pieces of the rectangular frame, in which are mounted the planting-arms, said side pieces being securely connected together at the top by the cross-piece B.

C is a shaft which has its bearings in the side pieces, A, and to which is secured a rectangular frame, D. The frame D is rigidly secured to the shaft C, and is adapted to be revolved therewith by means of a pulley, E, and chain or belt F, which receives its motive power from a driving-pulley on the carriage wheel or axle to which the planting-frame is attached. As no point of novelty is based on the carriage and driving pulley, it is not shown in the drawings.

Two or more of the rectangular frames D, in which the planting devices are secured, can be attached to the shaft C; but in practice a single frame with the planting devices secured in each end will be found sufficient.

To the ends of the rectangular frame D, and on their rear, are rigidly secured the hollow metallic points G, (only one of which is shown,) of a triangular pyramidal shape, which is a receptacle for the plant, and also makes a hole in the earth to receive the plant. The flat side of the triangular point is forward, and is removed to allow of the escape of the plant, and in lieu of it a rectangular plate or extension, I, is made, capable of being moved back and forth as a valve within grooves a on the inner and central line of the planting-arms D. A similar but smaller solid point, H, is secured to the lower end of this valve-plate, which, when closed on the hollow point G, serves to complete the hole forward in the soil, and prevents the earth from falling in and clogging the root of the plant when the valve or plate I is moved upward.

A cross-bar, J, is rigidly secured to the plate I, the ends of which project beyond the outer sides of the frame D, so as to impinge on the cam-plates K on the frame A, and be drawn down so as to close the point H over the point G, for the purpose of holding the plant in the point G while the hole is being made in the earth. (See Fig. 2.) A spiral or other spring, b, is secured at one end to the cross-bar J and at the other end to any convenient point on the frame D, so that when the arms of the cross-bar J shall have passed the cam-plates the spring will cause the point H to be drawn back and the plant will be free to drop in the cavity formed by the points G and H.

L L are disks rigidly secured to the shaft or axle C and to the outer sides of the planting-frame D. These disks are of peculiar construction, being cut away to form notches or recesses c, the office of which will be more fully hereinafter described.

To the inner side and lower ends of the frame A are pivotally secured the levers d, at e, one on each side of the frame. The levers d are provided at their upper ends with inwardly-projecting pins f, against which the disks L impinge, and said levers are connected to one arm or end of the bent or bell-crank levers g by means of links or bars h. The bent or bell-crank levers g are pivoted to the inside of the frame A, as shown at i, and to the outer end of said levers is secured a link or hook, which connects it with another bell-crank lever, j, pivoted at k to an arm or support, l.

To the inner or upper arm of the bell-crank lever $j$ is secured a spiral spring, $o$, the upper end of which is secured to the frame A. The lower end of the bell-crank lever $j$ is pivotally secured to the bars or tampers $m$, the inner ends of which are enlarged for the purpose of pressing the earth inward toward the point of the planter and around the roots of the plant. The tamping-bars are also connected to the arm or support $l$ by means of parallel bars $n$, which tend to support and direct their line of motion to that parallel, or nearly so, with that of the surface of the ground.

M is a bent arm rigidly secured at both ends to the sides A, and by which the device may be raised and lowered by hand. I may, however, and shall in practice, provide means for raising and lowering the planter from the driver's seat by means of cords passing over pulleys on the rear ends, R, of the carriage-frame, and secured to disks or other devices on the outer ends of the shaft C, as shown in Figs. 1 and 2.

P P' are bars of equal length on each side of the frame A, the upper ones being pivotally secured at their forward ends to the axle of the carriage and at their rear ends to the shaft C, the lower ones being also pivotally secured some distance below the former, and parallel to them at their forward ends to the frame of the carriage, and at their rear ends by the pins $s$ to the side pieces, A, the object of this parallel arrangement being to maintain the rectangular frame A always in a vertical position, so that the devices upon it for operating the valve of planting-point, as also the tampers or pressers, may uniformly act at the same points, whether the frame A be raised or lowered for shallow or deep planting.

It is obvious that the rotation of the planting wheel or arms can be regulated, and is governed by the diameter of the pulley E, and the distance between each plant accurately determined.

As above described, the machine is drawn forward and operated by horse-power; but it may also, with suitable modifications, be pushed forward and operated from behind by a man or boy.

The operation of my device is as follows: The carriage, in its forward movement, causes the endless chain to revolve the pulley E, and with it the planting wheel or frame D. As the hollow point G comes around, and before it comes to a level with the shaft C on its forward travel, the valve or point H being held up by the spring $b$, the plant is inserted into the hollow point G with the root outward. The wheel or frame D, in revolving, causes the ends or projections of the bar J to strike against the cam-plates K on either side, which gradually closes the point or valve H over the point G and incloses the plant therein. When the point G has reached its lowest point the ends of the cross-bar escape from the cam-plates K, and the point H is drawn up by means of the spiral spring $b$, opening the hollow point and permitting the plant to escape. Through the remainder of the revolution of the wheel or frame D the valve or point H is held up until the ends of the cross-bar J again strike the cam-plates. After the hole is formed in the soil and the plant deposited, the carriage, in its forward movement, causes the hollow point G, in its revolution, to gradually emerge from the hole till the surface of the soil is reached, at or near which point the pressers $m$ $m$ on each side are thrown toward each other and press the soil around the roots of the plant.

The operation of the pressers is as follows: The disks impinge on the pins $f$ during the greater part of their revolution, and in doing so press the pivoted levers down, and through the links and bell-crank levers keep the pressers in an elevated position. So soon, however, as the cut-away portion $c$ of the disks comes in contact with the pins the force of the springs throws the pressers forward, and the cut-away portion of the disks allows the arms or levers to fly back therein. This is, however, but momentary, for the disks again impinge on the pins in their continuous revolution and force the levers down, which again raises the pressers for the tamping of another plant.

Having thus described my invention, what I claim, and desire to secure by Letters Patent, is—

1. The combination of the planting wheel or frame D, provided with the rigid hollow point or points G and movable face or faces I, with the cross-bar J and cam-plates K, whereby the planting-point is closed to retain the plant therein during the downward movement of said point.

2. The combination of the planting wheel or frame D, provided with the rigid hollow point or points G and movable face or faces I, with the cross-bar J and spring $b$, whereby, when the ends of the cross-bar J have passed at the lower ends of the cam-plates, the movable face will be raised to allow the plant to be deposited in the soil.

3. The combination of the disks L, secured to the shaft C, and frame or wheel D, with the pins $f$, pivoted levers $d$, links $h$, bell-crank levers $g$ and $j$, parallel bars $n$, and presser-bars $m$, whereby the presser-bars are held back from contact with the earth during a part of a revolution of the planting wheel or frame, as set forth.

4. The combination of the disks L, provided with the notch $c$, with the pins $f$, pivoted levers $d$, links $h$, bell-crank levers $g$ and $j$, parallel bars $n$, pressers $m$, and springs $o$, whereby the presser-arms are thrust forward in a line parallel with the surface of the ground and the soil is pressed around the root of the plant, as set forth.

In testimony whereof I affix my signature in presence of two witnesses.

JOHN C. TENNENT.

Witnesses:
JOHN A. JOHNSON,
JERE. T. DUCKER.